Aug. 17, 1926.

W. M. WALLACE

PACKING

Filed April 25, 1923

1,596,469

Inventor
William M. Wallace

By Greene & Greene
Attorneys

Patented Aug. 17, 1926.

1,596,469

UNITED STATES PATENT OFFICE.

WILLIAM M. WALLACE, OF WALLACETON, VIRGINIA.

PACKING.

Application filed April 25, 1923. Serial No. 634,505.

Reciprocating pistons and other bodies having analogous relative movement while in contact have not reached perfection, although almost innumerable constructions, patented and unpatented, have been devised with the object of reducing or eliminating one or another of many recognized defects. Among the evils sought to be corrected are the tendency of the actuating fluid to pass the piston and enter a space where it is seriously detrimental: the tendency of the necessary lubricant to pass similarly from end to end of the piston, often by a continuous pumping action; failure to maintain accurate clearances of the piston and cylinder on all sides; rapid wear; and "slapping" of the piston, or swinging from side to side under constantly changing obliquity of the pitman through which motion is transmitted.

With pistons of reciprocating engines, it is usual to provide one or more circumferential piston grooves, and to place therein a piston ring or rings arranged to exert radial outward pressure against the cylinder wall, the pressure being, as nearly as may be, uniform at all points of the circumference. It is not practicable to have the piston fit the cylinder absolutely, because change of temperature causes unequal expansion, and besides wear would quickly destroy the close fitting. For like reasons, no piston ring, when made, fits its groove exactly, for heating the groove walls slightly more than the rings would then lock the parts fast as if welded in place, and the effective action of the piston ring would be lost.

This invention has among its objects, avoiding serious movement of lubricant or actuating fluid from end to end of the piston, while reducing wear and "slap" and without increasing cost.

In the accompanying drawings, a reciprocating internal combustion engine has been selected for illustration, but a pump or other structure, where relative movement of two bodies is involved, might have been chosen.

In these drawings,—

In these views, A represents a hollow piston adapted for attaching at B the usual pitman, the shell being open below, as usual, to allow the pitman to swing from side to side.

The piston is provided with an annular open groove extending from C to D and in the bottom of this groove are formed a series of grooves, E, shown as three in number. In these grooves are placed rings F, shown in this instance as duplicates, which do not extend to the bottoms of their grooves, whereby an annular space G is left within each, and further fit laterally but not too closely in their grooves, so that each ring can move slightly, as a whole, parallel to the piston's axis. Between the peripheral portions of consecutive rings F are rings H which fit the corresponding spaces between the rings F but do not extend to the piston-portions between the grooves E, whereby spaces I are left within these rings H. The rings may be such as tend, at every part of the circumference to press outward slightly beyond the peripheral surface of the piston and so at all times make approximately uniform contact with the cylinder J.

Figure 1:
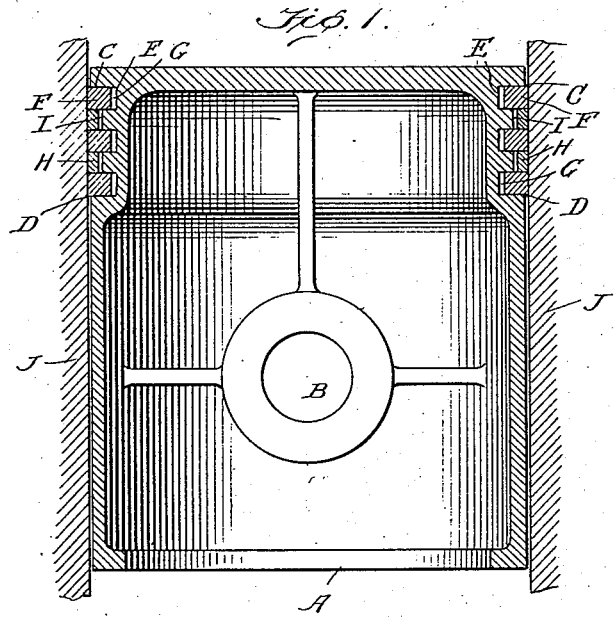
Figure 1 is an axial section of a piston with rings.
Figure 2:
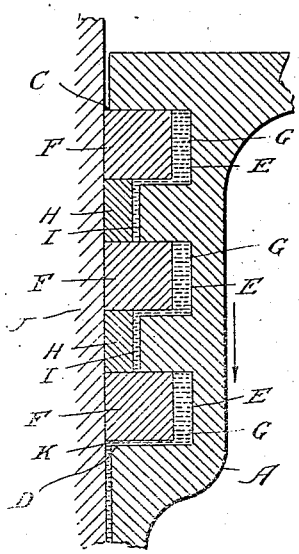
Fig. 2 is a like enlarged fragmentary view of one side of the structure of Fig. 1, the rings being in the position they assume when the piston is moving in the direction of the arrow.
Figure 3:
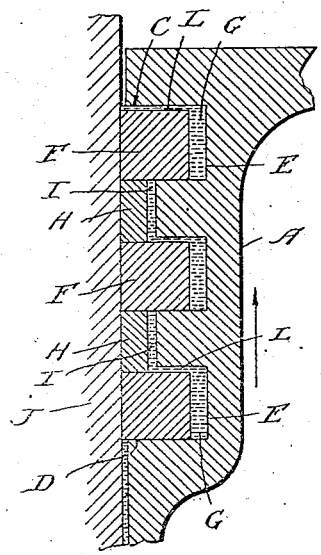
Fig. 3 shows, similarly, the same parts when the piston is moving in a contrary direction.

From the construction it is evident that all the rings may move together along the piston back and forth, to a distance equal to the clearance K, L, alongside the rings F as they lie in their grooves E, and plain that they will have this relative movement because of their contact with the cylinder J, which causes a lag. If the piston begins to move in the direction of the arrow, the rings will all lag and the passages K will open below each ring F. Lubricant in the cylinder can then enter the lower space G but cannot pass on to other spaces G, I. When the direction of the piston's movement is reversed, the rings move relatively, and the lower space K closes. This closing forces a small amount of lubricant out, and a little is forced from the lower space G through the second clearance L and into the lower space I, then rising slightly, and may travel ultimately onward through all the clearance spaces and be discharged against the cylinder wall through the upper clearance L, Fig. 3. It is to be noted that only a very slight amount of lubricant in the lower crevice or clearance L can so pass along the piston. It is also important that none of the rings bears inwardly upon the piston, but that each rests against a body of lubricant, and that the rings move along the piston like a unitary structure, no crevices opening between the rings, whose relative movement and wear are practically nil.

As shown, the rings are supposed to be of metal and divided in the usual way, but neither metal nor division is indispensable. Division is not shown, since it is not material how yielding is secured.

Forcing lubricant into the spaces G, I, by small increments entering through relatively small crevices, gives the power multiplying action of a hydraulic press, and as the ring of liquid in G or I transmits this power uniformly, the device itself tends to give uniform pressure in each of the spaces G and I. The piston necessarily being slightly smaller than the cylinder, and the several rings being larger than the piston, barring the passage of lubricant, the lubricant forms a thin annular layer about the piston's skirt and the outwardly pressing rings prevent all "slapping" action.

If the action of the lubricant around the upper, lower, and inner sides of the rings be compared with the movement of the lubricant when a series of rings out of contact with each other, or in separate grooves, are used, it will be noted that the two actions differ radically. Practical use of the form last mentioned and of devices like the new form in principle shows results that differ greatly. No harmful amount of lubricant travels around the rings and along the piston, while in the old forms the lubricant is constantly pumped around each ring, one after the other, without obstruction, at each movement of the piston. This construction also bars the passage of the piston-actuating fluid, there being interposed body after body of lubricant (within the different rings), and these bodies cannot be instantly displaced by explosions.

It is also clear that only the peripheral surfaces of the rings act against the cylinder and thus wear materially, they being the only parts which make contact and have material relative movement, whereby the usual wear on the plane contacting faces of the rings and of the corresponding faces of the grooves is practically eliminated.

Obviously, piston and plunger are interchangeable terms, so far as this invention is concerned, the one being commonly applied in power generators, the other in devices of the pump type.

It is an important fact that this construction lowers the usual temperature of the piston, which is often high enough to seriously carbonize such lubricant as comes in contact with the parts most highly heated by the explosions. With splash lubrication, carbonized lubricant contaminates that in the crank case, and the evil is cumulative. This desirable result is due to the fact that the metal of the piston is in direct contact at many points with the metal of both the main and intermediate rings, all of which rapidly transmit heat to the cylinder to be there eliminated by the cooling system usually employed. At somewhat high temperatures, even the bodies of lubricant between the piston walls and the inner faces of the rings aid materially in transmitting heat. Even if a ring is out of direct contact with the cylinder, its non-wearing plane surface is in contact with the adjacent ring and through this, as well as through the lubricant itself, heat is transmitted independently of direct contact with the cylinder.

What I claim is:

1. The combination with a piston, of rings encircling the piston, lying in grooves therein and spaced from the bottom of the grooves, a second set of rings alternating with the rings of the first set, filling the intervals between the latter, and spaced from the piston portions in the intervals, said sets of rings when in use forming a substantially continuous cylindrical surface.

2. The combination with a piston having a broad circumferential groove with narrower rib-separated circumferential grooves in its bottom wall, of piston rings each lying in a correspondingly narrow groove and spaced from the bottom thereof, and other rings fitting closely between consecutive rings of the set first mentioned and spaced from the corresponding ribs, the rings forming, together, a substantially continuous cylindrical surface.

3. The combination with a piston, of rings encircling the piston, lying in grooves therein and spaced from the bottom of the grooves, a second set of rings alternating with the rings of the first set, filling the intervals between the latter, spaced from the piston portions in the intervals, and freely movable slightly, as a unit, along the piston with the rings first mentioned, whereby lubricating liquid may fill the spaces within the several rings of both sets and communicate with the exterior of the piston at the ends thereof, alternately through slight crevices.

4. The combination with a piston having spaced circumferential grooves alternating with piston portions between said grooves and at some distance within the pistons' general peripheral surface, of a set of rings, each nearly filling laterally one of the grooves and spaced from the bottom of the latter, a second set of rings filling laterally the spaces between the rings of the first set and spaced from said piston portions; whereby the rings move slightly back and forth as a whole when the piston reciprocates, opening and closing crevices alongside the rings of the first set, putting the spaces within the rings in intermittent communication with the exterior of the piston while the rings are constantly in lateral contact with each other.

In testimony whereof I hereunto affix my signature.

WM. M. WALLACE.